April 12, 1960
R. POESCHL
2,932,340
ENDLESS LAMINATED BELT AND
METHOD OF MAKING THE SAME
Filed May 7, 1957
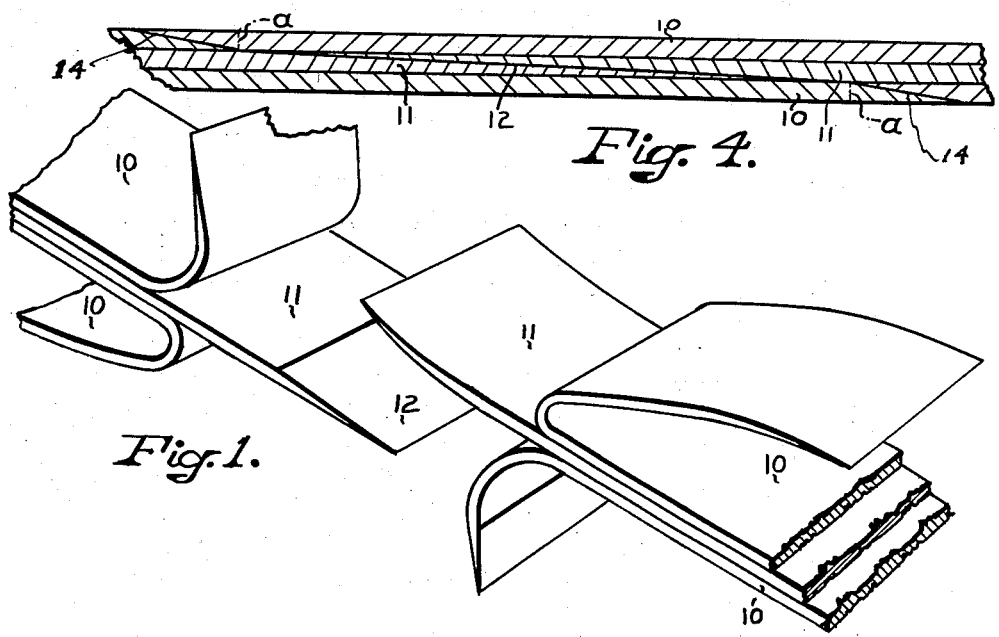
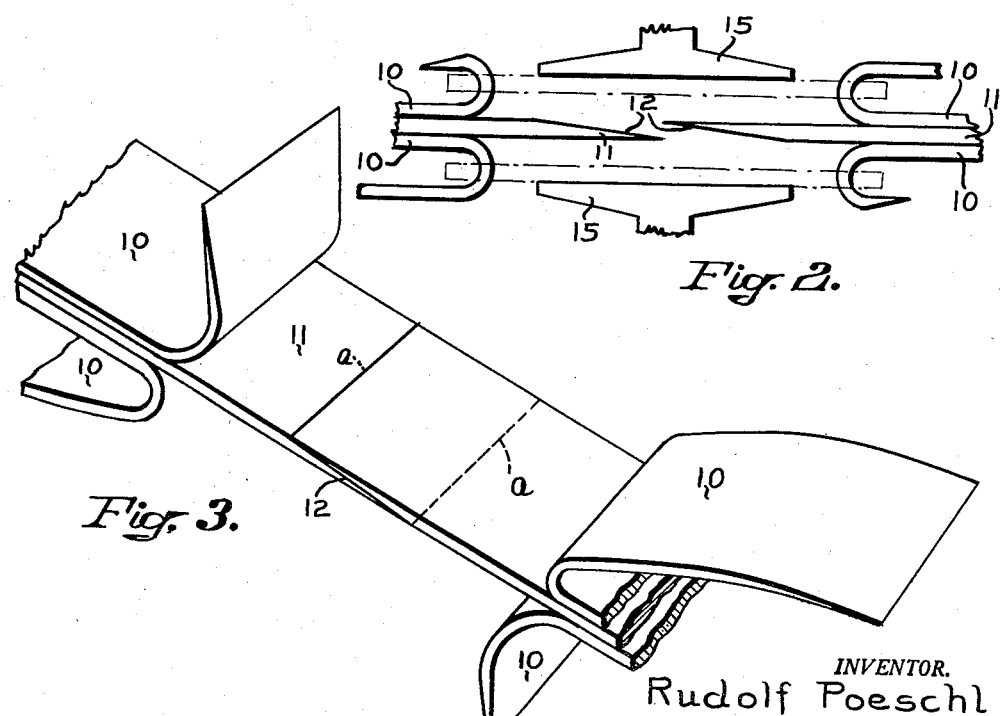
INVENTOR.
Rudolf Poeschl
BY
ATTORNEY

United States Patent Office 2,932,340
Patented Apr. 12, 1960

2,932,340

ENDLESS LAMINATED BELT AND METHOD OF MAKING THE SAME

Rudolf Poeschl, Vienna, Austria, assignor to Hope Rubber Co., Inc., Fitchburg, Mass., a corporation of Massachusetts Application May 7, 1957, Serial No. 657,632

8 Claims. (Cl. 154—4)

This invention relates to an endless laminated belt and a method of making the same.

Power transmission belts often comprise a laminated structure having an inner flat layer or strip of strong material capable of transmitting a considerable proportion of the power and an outer layer adapted to grip a pulley. Such a belt may be made endless by cutting a desired length and skiving its two ends to provide short bevels which are cemented together to form an endless body. However, various problems have been met both in making the laminated belt structure and in connecting the ends of two laminated sections to form an endless belt. If, for example, each belt end is skived at the same angle by means of a knife, there may be too little surface on the beveled edges for cement adhesion to make a strong joint. This is particularly the case if the inner layer is thinner than the outer ones and there is only a narrow surface on its beveled edge for carrying the cement. Also, whatever may be the angle of the bevel or the thickness of each layer, it may be difficult to provide an adequate strength for the inner layer due to insufficient cementing area and to imperfections in the cemented joint.

I have found that it is often desirable to cut the inner layer at a more acute angle than the outer layers so as to provide a larger or longer surface for the cemented joint, but this cannot be done satisfactorily by the standard skiving knife and especially where the layers are not independently beveled. Furthermore, if all of the laminated layers are cemented at laterally overlapping locations, the compound joint may be too stiff or not sufficiently yielding to give proper elasticity, and the joint may pound the pulley as it passes thereover.

I have also found that a traction layer or strip may be made of a polyamide resin in a filament form capable of carrying substantially all of the power and that it may be connected substantially integrally to a friction strip, such as leather, having a high coefficient of friction capable of transmitting the power efficiently from a pulley to the belt. Also, the two or more strips may be connected together laterally by a cement medium having such a composition as to permit a ready separation of the traction and friction strips without detrimentally affecting the traction strip, whereby the two ends of the traction strip may initially be connected to form an endless structure before the friction strip ends are connected.

An object of the invention is, therefore, to provide a laminated belt which may have two cut ends of the belt cemented together in a substantially integral structure of a required strength which is equal to that of the main belt structure.

Another object is to provide such a laminated structure which permits separation of the strips at its cut ends and the subsequent joining of the strips separately.

A further object of this invention is to provide a method of making an endless laminated belt having a traction strip of a polyamide resin and a leather friction strip and of joining cut ends of the strips independently and cementing the strips together by a cement which permits such independent procedure.

A still further object is to make a belt having the cut ends of a traction strip and a pulley gripping friction strip cemented together by interleaved beveled ends at joints which are longitudinally displaced. Other objects will be apparent in the following disclosure.

Referring to the drawings illustrating the invention:

Fig. 1 is a perspective view of the belt ends of a three part laminated belt structure showing the belt ends split apart preparatory for the first cementing operation;

Fig. 2 is a diagrammatic view illustrating the procedure of cementing the inner juxtaposed ends of the traction strip;

Fig. 3 indicates the final cementing step after the strip ends have been connected; and Fig. 4 is a fragmentary sectional view of the jointed portion of the belt.

Referring to the drawings, the belt may comprise a multi-layer body, such as one having at least one and preferably two outer layers 10 of leather, or other suitable friction material capable of gripping a pulley, and traction strip or tape 11 of adequately strong power transmitting substance. The several ends of the several layers or strips are cemented together and to each other. The inner tape ends are beveled at 12 and connected by a cement. The two outer strips 10 likewise have beveled end faces 14 cemented together, as will be described.

Of the various materials which may be used for the inner tape, I may employ a polyamide resin, such as a nylon condensation product of adipic acid and hexamethylene dyamine or a Perlon resin formed as a condensation product of polycaprolactam. The selected resin may be extruded as filaments, and a group of filaments may be united in a parallel arrangement to form a tape of suitable width, and the tape thus made may be elongated below its breaking point to orient the molecules and thereby provide a structure having a high strength. A wide tape may be made by arranging and joining several narrow tapes at their longitudinal edges, as by a cement solution of the resin. However, from the broader aspects of this invention, various other strong synthetic resin polymers may be employed.

The synthetic resin polyamide has high tensile strength but may not provide sufficient friction for driving a pulley; hence the tape is covered with leather, rubber or other frictional substance. For example, the driving face may be made of a chrome tanned grain leather and the other side of the tape may be protected by a layer of split leather or other material.

A strong multiple layer belt may have an inner traction tape of nylon or Perlon tape formed of parallel extended filaments of the resin which have been suitably cemented together, as by a solution of the resin. A frictional strip of leather is secured to the traction tape and preferably by a cement which permits a subsequent separation of the leather strip from the traction tape without materially affecting the latter. For this leather cement, I may employ a solution of a synthetic resin or polyamide condensation product, wherein the resin is soluble not only in a solvent for the tape resin but also in a solvent which will not dissolve the tape resin. For example, I may employ a nylon type of condensation product for a cement which will hold the leather to a Perlon tape. A suitable nylon cement may be formed of 1 part by weight of nylon polyamide type 8, 2 parts water, 8 parts of ethyl alcohol and ⅛ part of ethyl hexanediol. Other strength-imparting materials may be added or used. This cement has ethyl alcohol as a solvent, so that the leather cement may be removed subsequently by soaking the leather with the alcohol. The alcohol will not dissolve a Perlon resin, whereas both of the resins may be dissolved in formic acid. Hence by using a formic acid solution of the Perlon for cementing the Perlon tape material and by using a cement for the leather which does not dissolve the Perlon, I provide for a ready separation of the two strip materials on the belt without detrimental effect.

The traction layer, such as the Perlon tape, may be made thinner than an outer leather layer. That is, an inner tape may vary in thickness from 0.3 to 4.0 mm., such as a thickness of 1.5 mm. while the outer chrome leather layer thickness may be 3 mm. thick and the protection layer of split leather at the rear may be 5 mm. thick. If, for example, a belt made of such different materials and layer thicknesses is cut at the same diagonal angle and the beveled faces of the two belt ends are cemented to form an endless structure, then there will be only a very small surface on the thin traction tape for cement adhesion. I, therefore, propose to cut the different layers at suitable different angles which permit each layer to have the required length and extent of surface for optimum cement adhesion.

To this end, I propose to strip away the leather layers from the inner traction tape so as to provide access to the inner traction tape. Then each layer is beveled independently of the others to provide a required cementing surface contact. Thereafter, I cement the inner tape beveled surfaces first and make an integral joint thereof. After this, the outer layers are positioned over the inner tape joint and connected by the required cement not only to each other but to the inner tape body. Also, I prefer that these outer joints be longitudinally displaced relative to the inner cemented tape joints so that the tape joints of the several layers are not superimposed and will not pass over a pulley face at the same time but will travel successively and thus not pound the pulley bearings. Since the synthetic resin tapes which are best suited for my purposes are usually very thin, I have found that the bevels are best provided by a grinding operation rather than a skiving knife cut. A grinding wheel of suitable grain structure and bond will grind the cut belt ends accurately to provide long beveled faces.

To make a satisfactory joint, I have found that there is a required relationship between the thickness of the inner belt tape and the area of the beveled face. This arrangement of the belt parts is shown particularly in the sectional view of Fig. 4 as later described.

It is preferred that the length of the bevel of the ends of the inner traction tape lie within the range of about 25 to 50 times the thickness of the tape, as shown in the following table:

| Tape Thickness, mm. | Bevel Length | | Total Joint Length, mm. |
|---|---|---|---|
| | Tape, mm. | Leather, mm. | |
| 0.3 | 15 | 20 | 55 |
| 0.8 | 35 | 30 | 95 |
| 1.6 | 50 | 35 | 120 |
| 3.0 | 80 | 40 | 160 |
| 4.0 | 100 | 40 | 180 |

For this table, the belt is made of a Perlon tape covered on both sides by leather layers of a suitable thickness. The first column gives the thickness of the inner traction tape in millimeters. The second column gives the length of the beveled face of each inner tape end. The third column gives the length of the bevel on each of the outer leather layers, and the fourth column gives the preferred overall length of the jointed beveled portions of the belt.

As shown by the table, I have found that the thicker the tape, the less may be the length of the bevel proportionately. For a 0.3 mm. thickness of tape, the ratio of the length of the bevel to the thickness is about 50, whereas for a tape thickness of 4 mm. the ratio is about 25.

The same range of bevel lengths may be used for nylon and other tape materials. Also, as shown by the table, the bevel on the outer leather strips may be widely varied, depending on the thickness. Since the function of the leather is to provide frictional engagement with the pulley and is not primarily for longitudinal traction, the above ratio may be widely varied for the leather. The tape proportions may be varied and an even more extensive contact area for the cement provided, and the claims are to be interpreted as covering such variations.

As indicated by the drawings, the several strips are connected together in an interleaved arrangement by a succession of steps, so that the opposed strips are cemented together not only at the bevels but also between their overlapping side faces. This operation of making a belt joint is done in a multiple step procedure, whereby the leathers are first pulled back and the two ends of the inner strip 11 are beveled at the required angles and extent of surfaces. Thereafter, their two opposed beveled faces 12 are cemented together in their final condition. Thereafter, the pairs of the upper and lower leather layers 10 may be cemented in an overlapping arrangement relative to each other and to the inner precemented continuous belt strip. It is preferred to connect the strip ends in three separate steps, but it is feasible to do this in a two step procedure. The belt may be made of leather layers initially cemented to an inner Perlon tape by a cement comprising a solution of nylon, and the cement for the inner traction tape may have Perlon as its primary constituent. The nylon resin is soluble in ethyl alcohol. The Perlon resin is soluble in formic acid, hence a cement for the tape resin may be formed of such a solution. This difference in the cement solvents permits a separation of the belt layers.

According to the preferred procedure, the belt material is cut to the desired length, and the outer leather layers are separated from the inner tape to provide working access thereto. To this end, a suitable solvent for the leather cement, such as ethyl alcohol which will dissolve the nylon cement, may be applied to the outer leather faces of the belt ends until the leather has become saturated. When the cement has been softened, the leather plies may be separated, as by means of a blunt knife, from the inner tape. These outer leather layers are stripped back, such as a few inches, so that they may be bent out of the way, as shown in Fig. 1, to expose a sufficient surface of the inner layer. These exposed faces may be cleaned with suitable solvents as desired.

Since the leather ends are separate and free from the inner traction strip, each strip may be cut to a suitable length and beveled independently of the others. Thus, the interleaved arrangement may be made as desired to provide extensive interconnected beveled faces and side surfaces. The beveling step is preferably accomplished by applying the strip end to a rotated grinding wheel of suitable abrasive material, grit size and wheel speed. Any irregularities of the beveled surfaces may be subsequently corrected by a sharp razor blade or file, if necessary. The bevel lengths are preferably made according to the above table, but a wide latitude may be had in the ratio range of tape thickness to bevel length, provided there is given a considerable area for cementing contact. This procedure insures that each layer is beveled satisfactorily at the proper angle.

The two beveled faces 12 of the two opposed ends of the inner tape are first cemented together, while the outer leather strips are held out of the way, as by means of clamps. To this end, a thin coating of a suitable cement is applied to the beveled faces of the tape. This cement may be made by dissolving some of the tape substance in a suitable resin solvent, such as by dissolving Perlon resin in a concentrated formic acid of 85–93° Bé. Similarly, a nylon filament tape may be cemented by a solution of a nylon resin, as above described. Upon pressing the two adhesive surfaces together and curing the cement resin, they cohere to form a joint that is substantially integral with the substance of the tape ends. When the fluid cement has thickened adequately on the tape bevels the two faces are brought into a correct contact, and the joint is carefully inspected by looking through the translucent resin to make sure that there are no air bubbles and the joint is otherwise satisfactory. This inspection is feasible only while the leather strips are out of the way; hence there is a material advantage in this serial step procedure. Then, and preferably with the aid of elastic cushions, such as leather, applied to the opposite faces of the juxtaposed inner layers, a pair of pressure plates 15, illustrated diagrammatically in Fig. 2, are applied and the inner layers are held under heat and sufficient pressure, such as 200 pounds per square inch, until the cemented joint has set. These plates are preferably heated electrically to 160° F. and the power then disconnected, and the belt parts are held in the press for 2 hours while the pressure is maintained and the press cools. This forms a substantially integral joint.

After the inner tape ends have been joined, as is shown in Fig. 3, then the outer layers of leather may be connected together and to the inner tape. To this end, and preferably while the inner polyamide tape is still held in the cooling press, the inner leather faces only may be coated with a nylon type of fluid cement, such as above defined. After the initial cooling period of 2 hours has elapsed and the pressure blocks have been removed, the two side faces of the polyamide traction tape may be coated with some of the fluid cement initially applied to its bevels. Since in the specific example, the leather surfaces are coated with the nylon cement and the Perlon surfaces are coated with a solution of Perlon, the leather is protected from any free acid or solvent of the tape cement. Then, while the cement coatings are adhesive, the leather strips are laid into place, as illustrated in Fig. 4, with the different adhesive cement surfaces in contact. This portion of the belt is then placed in the press with sufficiently long press plates, as indicated by the dotted outlines in Fig. 2, so that all of the leather cement joints are overlapped. Thereupon the pressure and heat are again applied. The final curing step may involve the same pressure of 200 pounds per square inch and an initial temperature of 160° F., but the cooling period is preferably extended to six hours to make sure that the cement throughout the belt is cured and the joints are substantially integral with the connected belt parts.

Since the leather may be detrimentally affected by the solvent of a cement that is compatible with the polyamide tape resin, such as a solution of the resin, the leather is protected from that solvent by a different polyamide cement coating of sufficient thickness to insure that the tape cement solvent can dissolve only the surface portion of the coating and insure an integral union, but it will not penetrate the coating fully before the curing stage. That is, the leather cement is such that its solvent will not dissolve the tape resin. On the other hand, the tape cement solution applied to the tape just before the leather strips are laid in place will dissolve the leather cement resin and so can make an integral union between the tape and the leather cement, but the solvent action is stopped by the heat curing before the leather is affected. It is sometimes feasible to cement together the ends of one side strip of leather in a three layer belt after the tape joint has been assembled and to cure this leather joint at the same time with the tape joint in a two step process. The three step procedure is preferred.

It will also be noted that, as shown in Figs. 3 and 4, the left hand free end of the upper layer 10 is short and the right hand end is long. The reverse arrangement is to be found at the bottom in which the right hand lower end is short and the left hand one long. Thus, when the upper left hand end has been coated with its cement on the under side for adhesion to the inner tape and is forced back into a horizontal position, its edge will lie at the line $a$ shown in Fig. 4 which represents the edge of the inner joint 12. Also, the right hand upper leather strip will fold back over the left hand piece so that the joint between the two parts will be at the left of that line $a$. The same condition applies to the lower parts, in which the shorter leather piece is at the right and will fold over to the line $a$ while the left hand piece will overlap that to a point beyond this line as is determined by the length of the bevel. Thus, the two leather joints will be longitudinally displaced at the right and left of the inner tape joint 12 and these joints will, therefore, not be opposed and cannot pass over the pulley at one time but must proceed serially.

The Perlon resin, sold as Ultramid B, is a condensation product made from polycaprolactam which in turn is derived from amino acids. The Perlon Ultramid B resin has the formula

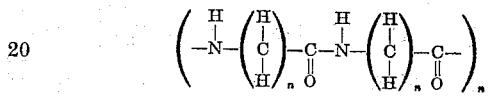

Both the Perlon resin and the nylon resin made from polyadipic acid hexamethylene diamine are polyamids; but they differ as above stated in their being soluble in different solvents. Both the Perlon and nylon resins are soluble in formic acid, whereas only the selected nylon resin is soluble in ethyl alcohol.

The term "traction tape," or the like, as used herein refers to the strip which receives and transmits the major portion of the power or the belt tension. The term "friction strip" refers to that belt layer which has a high coefficient of friction for gripping the belt pulley.

It will now be appreciated that various modifications may be made in the procedure and the belt structure within the scope of this invention. For example, if a nylon filament tape is employed and cemented by the nylon type of cement, the leather ends may be secured together by a suitable cement, such as a glue, as is used in the industry for cementing leather splices, provided the cement may be softened by a solvent or a procedure which will not affect the tape resin detrimentally. Hence, the above disclosure is to be interpreted as setting forth the basic principles of the invention and a preferred embodiment thereof and not as imposing limitations on the appended claims.

I claim:

1. The method of making an endless laminated belt comprising the steps of providing a laminated body containing a traction tape and a friction strip united laterally by a cement, cutting a required length of belt, treating the belt ends with a solvent for said cement, separating the strip from the tape only adjacent their ends, separately beveling the cut ends of the tape and the strip and providing extensive cementing faces, cementing together the opposed beveled faces of the tape, thereafter applying a cement to the opposed beveled ends of the strip and a cement to the inner adjacent faces of the strip and tape and pressing the beveled strip ends together and forming an endless belt structure.

2. The method of joining the ends of a cut belt of laminated flat inner and outer strips comprising the steps of separating the outer strips from the inner only at each belt end, beveling the ends of the inner strip to form beveled faces which have a length of 25 to 50 times the thickness, independently beveling the ends of the outer strips so that the beveled faces will contact in parallelism, initially applying a cement to and cementing together the beveled faces of the inner strip ends as an inner joint, applying a cement coating to the beveled faces of the outer strips and a cement to all exposed inner surfaces of the strips, assembling the ends of the cement coated outer strips over the inner joint, and applying pressure to set the cement coatings and thereby forming a cemented joint of interleaved beveled strip ends.

3. The method according to claim 2 in which the beveled surfaces are formed by grinding the beveled ends independently on an abrasive wheel.

4. The method of making an endless laminated belt comprising the steps of providing a laminated body containing a traction tape having polyamide resin filaments and a leather strip united laterally by a cement, cutting a required length of belt, treating the leather at the belt ends with a solvent capable of dissolving said cement and in which the tape resin is insoluble, stripping the leather away from the traction tape only at the two belt ends, separately beveling the cut ends of the tape and strip to provide faces of predetermined lengths, cementing juxtaposed beveled faces of the traction tape with a solution of a polyamide resin compatible with and capable of uniting the ends of the resin tape, separately uniting juxtaposed beveled leather faces to each other with a resin solution having a solvent in which said polyamide resin is insoluble and heating and curing the resin cements.

5. The method of making an endless laminated belt comprising the steps of cementing an inner traction tape containing filaments of polycaprolactam resin to outside leather strips by a heat curable polyamide cement having a solvent in which the Perlon is insoluble, cutting a desired belt length therefrom, treating only the belt ends with said solvent, stripping back the leather ends to free the tape ends, beveling the tape and leather ends separately, cementing the tape ends together by a heat curable solution of Perlon having a solvent capable of dissolving said polyamide, coating the beveled leather ends and the inner faces protectively with said polyamide cement, and heat curing the cements to provide integral joints at the cemented faces.

6. The method according to claim 5 comprising the steps of heat curing the tape cemented joint under pressure and inspecting the tape joint prior to assembling the leather strips thereover, coating the outside tape surface at the joint with a solution of the polycaprolactam resin which unites the tape integrally with the polyamide cement and heat curing the cements finally under the application of pressure.

7. An endless laminated belt comprising a traction tape of a multiplicity of non-woven parallel filaments of a polyamide resin united laterally by a polyamide resin and which has a tensile strength capable of withstanding the normal belt stress, a strip of leather cemented on one side of the tape which provides frictional resistance to slippage on a pulley, a strip of protective material cemented on the opposite side of the tape, each strip having ends forming a joint of overlapped beveled faces and a cement uniting the same as an endless body, the two beveled faces of the tape making acute angles with the tape sides which are materially smaller than the angles of bevel of the outer strips and each beveled tape face having a length at least from 25 to 50 times the tape thickness, said strip ends being interleaved and arranged with the joints of the outer strips displaced longitudinally from each other and arranged on opposite sides of the tape joint, the cement for the tape joint comprising a substance similar to that of the tape which forms a substantially integral tape and joint union and the cement between the outer strips and the tape and in the outer strip joints comprising a polyamide resin.

8. A belt according to claim 7 in which the filaments and their joint cement are primarily a polycaprolactam resin and the cement for the outer strips is primarily nylon.

References Cited in the file of this patent

UNITED STATES PATENTS

| 1,203,859 | Duecker | Nov. 7, 1916 |
| 1,404,848 | Gusdorf | Jan. 31, 1922 |
| 2,429,119 | Bloomfield | Oct. 14, 1947 |
| 2,435,749 | Lesesne | Feb. 10, 1948 |
| 2,441,970 | Lesesne | May 25, 1948 |
| 2,657,161 | Luitwieler | Oct. 29, 1953 |

FOREIGN PATENTS

| 713,830 | Great Britain | Aug. 18, 1954 |
| 750,356 | Great Britain | June 30, 1956 |